(12) United States Patent
Woodford

(10) Patent No.: US 12,570,515 B2
(45) Date of Patent: *Mar. 10, 2026

(54) BEVERAGE DISPENSING SYSTEM

(71) Applicant: Sherman Richard Woodford,
Louisville, KY (US)

(72) Inventor: Sherman Richard Woodford,
Louisville, KY (US)

( * ) Notice: Subject to any disclaimer, the term of this
patent is extended or adjusted under 35
U.S.C. 154(b) by 143 days.

This patent is subject to a terminal dis-
claimer.

(21) Appl. No.: 18/597,145

(22) Filed: Mar. 6, 2024

(65) Prior Publication Data

US 2024/0208794 A1      Jun. 27, 2024

Related U.S. Application Data

(63) Continuation of application No. 17/942,386, filed on
Sep. 12, 2022, now Pat. No. 11,952,259.

(51) Int. Cl.
B67D 3/00 (2006.01)
A01K 63/00 (2017.01)

(52) U.S. Cl.
CPC .......... B67D 3/0096 (2013.01); A01K 63/003
(2013.01); B67D 3/0061 (2013.01); B67D
2210/00047 (2013.01); B67D 2210/00062
(2013.01)

(58) Field of Classification Search
CPC ................ B67D 3/0096; B67D 3/0061; B67D
2210/00047; B67D 2210/00062; A01K
63/003
See application file for complete search history.

(56) References Cited

U.S. PATENT DOCUMENTS

| | | | | |
|---|---|---|---|---|
| 532,731 | A * | 1/1895 | Helmer ..................... | F25D 3/08 |
| | | | | 222/173 |
| 1,654,379 | A * | 12/1927 | Matzka ................ | B67D 1/0857 |
| | | | | 222/130 |
| 1,689,561 | A * | 10/1928 | Roddick .............. | B67D 1/0055 |
| | | | | 222/130 |
| 1,733,111 | A * | 10/1929 | Ames ................... | B67D 1/1405 |
| | | | | 222/320 |
| 3,324,829 | A * | 6/1967 | Dosamantes De Jose ................. | |
| | | | | A01K 63/003 |
| | | | | 392/471 |
| 5,575,405 | A * | 11/1996 | Stratton ............... | B67D 1/0872 |
| | | | | 222/78 |
| 11,926,516 | B2 * | 3/2024 | Tran ..................... | B67D 1/1211 |
| 11,952,259 | B2 * | 4/2024 | Woodford ............ | A01K 63/003 |
| 2005/0189378 | A1 * | 9/2005 | Eluck .................. | B05B 11/0005 |
| | | | | 222/321.9 |
| 2006/0175277 | A1 * | 8/2006 | Ho ...................... | B05B 11/0005 |
| | | | | 40/406 |
| 2008/0110932 | A1 * | 5/2008 | Wilson ................ | B67D 3/0029 |
| | | | | 62/331 |

* cited by examiner

*Primary Examiner* — Frederick C Nicolas
(74) *Attorney, Agent, or Firm* — Jeffery Frazier

(57) ABSTRACT
Embodiments are described of a beverage dispensing system
configured to give the illusion it dispenses aquarium water.

5 Claims, 9 Drawing Sheets

BEVERAGE DISPENSING SYSTEM

RELATED APPLICATIONS

The present application is a continuation of U.S. patent application Ser. No. 17/942,386 filed Sep. 12, 2022; which is incorporated herein by reference in its entirety.

FIELD

The present teachings relate to the field of beverage dispensers and more particularly to novelty beverage dispensers that are entertaining to observe and use.

BACKGROUND

There are many beverage dispensers designed to provide a user with a liquid beverage. While generally suitable for beverage dispensing purposes, the known beverage dispensers are otherwise typically uninteresting to look at and use. There is a need for a beverage dispenser that is interesting and/or entertaining for a user or onlooker. It is an object of the present teachings to meet such need by providing a beverage dispensing system configured to give the illusion it dispenses aquarium water.

SUMMARY OF VARIOUS EMBODIMENTS

An exemplary and non-limiting summary of various embodiments is set forth next.

Various aspects of the present teachings relate to, among other things, apparatus, systems, and methods for dispensing one or more beverages that create the illusion of dispensing an undesired liquid (i.e., a liquid other than a beverage), such as aquarium water.

According to various embodiments, for example, the present teachings provide a beverage dispensing system configured to give the illusion it dispenses aquarium water, comprising: (i) an aquarium tank comprising a top, a bottom, and a sidewall extending between the top and bottom; wherein the sidewall comprises a forward portion and a rearward portion; and wherein the aquarium tank is liquid-tight for holding water; (ii) a manually operable dispensing valve supported externally at the forward portion of the sidewall of the aquarium tank; and, (iii) an elongate conduit that extends through the rearward portion of the sidewall of the aquarium tank, traverses an interior region of the aquarium tank, and extends through the forward portion of the sidewall for fluid communication with the dispensing valve; wherein the elongate conduit and the dispensing valve together define a beverage flow line that is fluidically isolated from the interior of the aquarium tank and any aquarium water held therein; and further comprising (iv) a fitting on an end of the elongate conduit that is distal from the dispensing valve, for fluidically coupling one or more beverage supply lines to the beverage flow line.

In accordance with various embodiments, the present teachings further provide, for example, a beverage dispensing system configured to give the illusion it dispenses aquarium water, comprising: (i) a first container configured to hold a first beverage for dispensing; (ii) an aquarium tank comprising a top, a bottom, and a sidewall extending between the top and bottom; wherein the sidewall comprises a front portion and a rear portion; and wherein the aquarium tank is liquid-tight for holding water; (iii) a manually operable dispensing valve supported externally on the front portion of the sidewall of the aquarium tank; and, (iv) a first elongate conduit that extends from the first container, through the rear portion of the sidewall of the aquarium tank, across an interior region of the aquarium tank, through the front portion of the sidewall, and to the dispensing valve. In various embodiments, the first elongate conduit comprises a first end disposed for fluidic communication with the first container and a second end disposed for fluidic communication with the dispensing valve. Further, in various embodiments, the first elongate conduit and the dispensing valve together define a first beverage flow line that is fluidically isolated from the interior of the aquarium tank and any water held therein. According to various embodiments, upon operating the dispensing valve, (a) the first beverage flows from the first container, along the first beverage flow line, and out of the dispensing valve, and (b) any aquarium water held in the aquarium tank remains undispensed therein.

In accordance with various embodiments, the dispensing valve of the present teachings can further comprise: (i) a second container configured to hold a second beverage for dispensing; and (ii) a second elongate conduit that extends from the second container, through the sidewall of the aquarium tank, through an interior region of the aquarium tank, and to the dispensing valve. According to various embodiments, the second elongate conduit comprises a first end disposed for fluidic communication with the second container and a second end coupled for fluidic communication with the dispensing valve. In various embodiments, the second elongate conduit and the dispensing valve together define a second beverage flow line that is fluidically isolated from the interior of the aquarium tank and any water held therein.

In accordance with various embodiments, the dispensing valve of the present teachings can further comprise, for example, a beverage selection manifold, wherein the selection manifold is switchable between a first position for passing substantially only the first beverage through the dispensing valve, a second position for passing substantially only the second beverage through the dispensing valve, and a third position for blocking both the first and second beverages from passing through the dispensing valve.

In accordance with various embodiments, the present teachings further provide, for example, a beverage dispensing system configured to give the illusion it dispenses aquarium water, comprising: (i) a plurality of supply containers, each configured to hold a respective beverage for dispensing; (ii) an aquarium tank comprising a top, a bottom, and a sidewall extending between the top and bottom; wherein the sidewall comprises a front portion and a rear portion; and wherein the aquarium tank is liquid-tight for holding water; (iii) a manually operable dispensing valve supported externally on the front portion of the sidewall of the aquarium tank; and, (iv) an elongate conduit that extends through the rearward portion of the sidewall of the aquarium tank, traverses an interior region of the aquarium tank, and extends through the forward portion of the sidewall for fluid communication with the dispensing valve. According to various embodiments, the elongate conduit and the dispensing valve together define a beverage flow line that is fluidically isolated from the interior of the aquarium tank and any aquarium water held therein. In various embodiments, the system further comprises (v) a respective beverage supply line extending from each of the supply containers to an end of the elongate conduit that is distal from the dispensing valve, for fluidically coupling the beverage supply lines to the beverage flow line. According to various embodiments, upon operating the dispensing valve, (a) a beverage held in one of the containers flows from such container, through the beverage supply and flow lines, and out of the dispensing valve, and (b) any aquarium water held in the aquarium tank remains undispensed therein.

In accordance with various embodiments, a beverage dispensing system of the present teachings can further comprise one or more real or artificial aquarium-related items disposed in the aquarium tank, such as plants, rocks, fish, cleaning equipment, aeration equipment, or any combination of the foregoing.

In various embodiments, one or more beverage-supply containers of the beverage-dispensing system can hold a beverage, such as potable water, wine, soda, juice, milk, coffee, and/or other desired beverage(s).

BRIEF DESCRIPTION OF THE DRAWINGS

Other systems, methods, features and advantages of the present teachings will be or will become further apparent to one with skill in the art upon examination of the following figures and description, in which like or substantially similar parts are identified with like reference numerals, and wherein.

DESCRIPTION OF VARIOUS EMBODIMENTS

Reference will now be made to various embodiments. While the present teachings will be described in conjunction with various embodiments, it will be understood that they are not intended to limit the present teachings to those embodiments. On the contrary, the present teachings are intended to cover various alternatives, modifications, and equivalents, as will be appreciated by those of skill in the art.

Various aspects of the present teachings relate to, among other things, apparatus, systems, and methods for dispensing one or more beverages that create the illusion of dispensing an undesired liquid (i.e., a liquid other than a beverage). According to various embodiments, such undesired liquid can comprise aquarium water.

Figure 1:
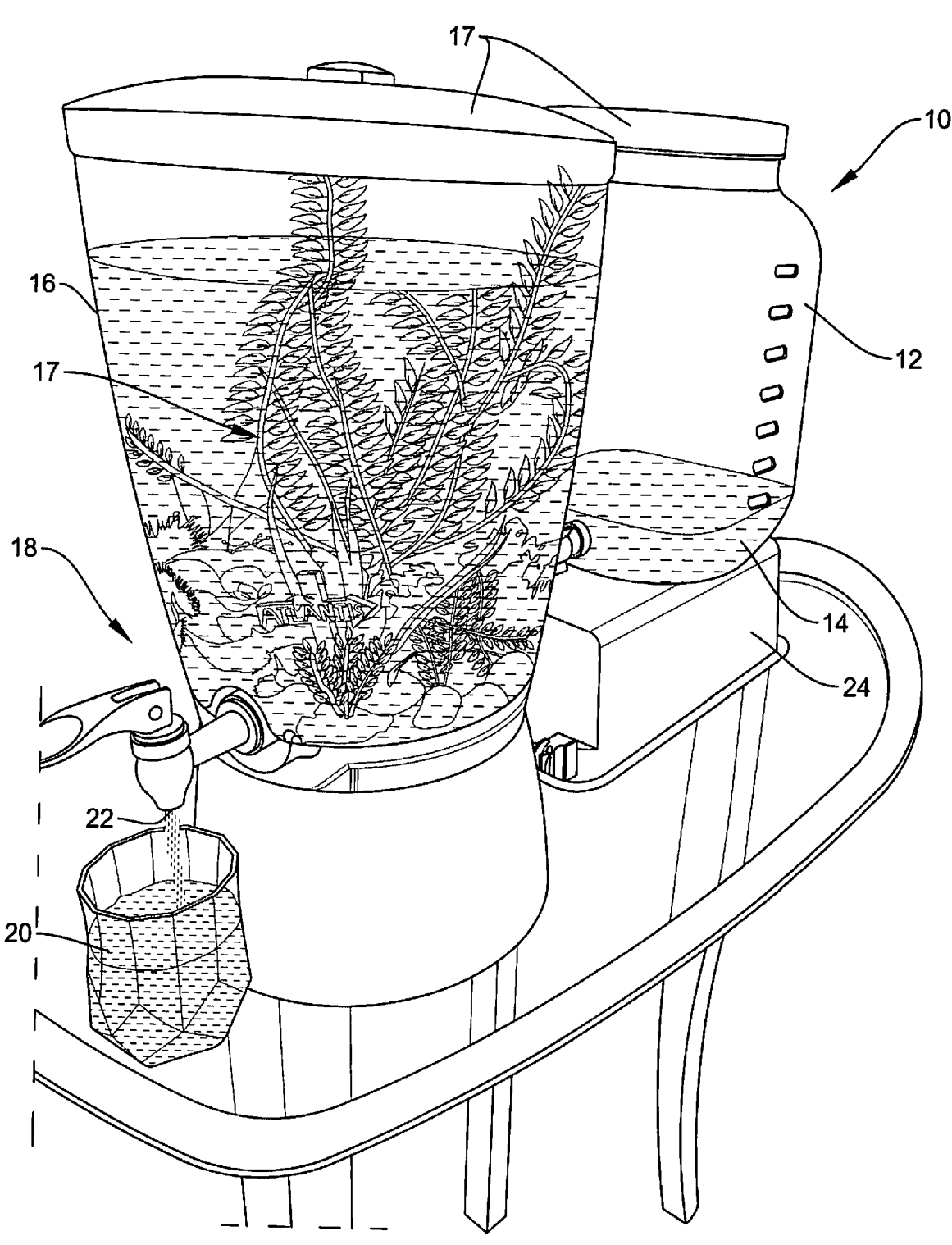
FIG. 1 is a perspective view of a beverage dispensing system, according to various embodiments of the present teachings.

FIG. 1 is a perspective view of a beverage dispensing system, denoted generally at 10, according to various embodiments of the present teachings. In the depicted embodiment, beverage dispensing system 10 comprises a beverage-supply container 12 configured to hold a liquid beverage, denoted at 14 in FIG. 1, for dispensing. Any suitable beverage can be held by beverage-supply container, including, for example, potable water, flavored water, coffee, soda, juice, milk, flavored milk, beer, wine, etc.

Beverage dispensing system 10 further comprises a faux beverage-supply container or tank, such as aquarium tank 16 in FIG. 1, disposed adjacent to beverage-supply container 12. Tank 16 is configured to hold a liquid selected to be one generally considered undesirable for drinking by a person. For example, in the depicted embodiment, real or simulated aquarium water can be held by tank 16. Further towards creating the impression of an aquarium, tank 16 can hold one or more real and/or artificial aquarium-related items (denoted generally at 17), such as plants, rocks, shells, fish, cleaning equipment, aeration equipment, and any combination of the foregoing.

Beverage-supply container 12 and faux beverage-supply container 16 can comprise any suitable container or tank. In various embodiments, for example, one or both of beverage-supply container 12 and faux beverage-supply container 16 can comprise a jug or bottle, such as a 5-gallon jug, for a water dispenser. According to some embodiments, one or both of beverage-supply container 12 and faux beverage-supply container 16 can comprise a container for pouring liquids, such as a pitcher. As previously indicated, in various embodiments, faux beverage-supply container 16 can comprise an aquarium. In some embodiments, faux beverage-supply container 16 comprises a large jar or fishbowl. Those skilled in the art will appreciate other suitable containers can be selected and employed.

Beverage-supply container 12 and faux beverage-supply container 16 can comprise any suitable material. For example, in various embodiments, beverage-supply container 12 can comprise plastic, glass, or a combination thereof. Similarly, according to various embodiments, faux beverage-supply container 16 can comprise plastic, glass, or a combination thereof. Other materials may be used as an alternative or in addition to plastic and glass.

A hand-operable dispensing valve assembly 18 extends outwardly from a lower region of tank 16. As further illustrated below, a conduit arrangement (not shown in FIG. 1) defines a beverage flow line that (i) extends from an outlet of beverage-supply container 12, (ii) passes through aquarium tank 16, and (iii) terminates at dispensing valve 18. In operation, a drinking cup or glass, such as 20, can be placed underneath a lower outlet 22 of valve assembly 18, and the valve assembly can be opened to permit liquid to flow from beverage-supply container 12, through valve assembly 18, and into glass 20.

According to various embodiments, one or both of beverage-supply container 12 and faux beverage-supply container 16 can be disposed upon a support structure, e.g., on a stand or table, such as stand 24 in FIG. 1. In various embodiments, beverage-supply container 12 is supported on a height-adjustable stand, thereby allowing for changes in the relative vertical positioning between the two containers, as desired.

Additionally, with continued reference to FIG. 1, one or both of beverage-supply container 12 and faux beverage-supply container 16 can include an appropriate cover or lid, such as at 17 in FIG. 1, for substantially closing a respective open top region. Suitable covers or lids include, for example, screw-on lids with mating threads in the lid and upper region of a respective container, and/or gravity- or friction-fitting lids, among others. In some embodiments, a cover incorporates a light with an on/off switch (not shown) for illuminating the contents of faux beverage-supply container 16 when the cover is in place. In various embodiment, the light is battery operated.

With the foregoing description and illustration of FIG. 1 in mind, it will be appreciated that, as a person first approaches the faux beverage-supply container 16 from its front (i.e., the side region of faux beverage-supply container 16 whereat dispensing valve assembly 18 is disposed) to dispense a beverage, beverage-supply container 12 will substantially be blocked or hidden from the view of such person by faux beverage-supply container 16. With their attention upon faux beverage-supply container 16, the person may reasonably believe that the liquid held in faux beverage-supply container 16 is the liquid that will be dispensed through dispensing valve assembly 18, upon operating such valve. However, upon operating dispensing valve assembly 18, the person will be entertained to find that liquid beverage 14 is dispensed instead—that is, a liquid beverage other than the initially expected liquid (i.e., the liquid visible in faux beverage-supply container) is dispensed. Even after learning about the illusion, the person may well continue to find observation and use of the beverage dispensing system 10 novel and entertaining.

Figure 2:
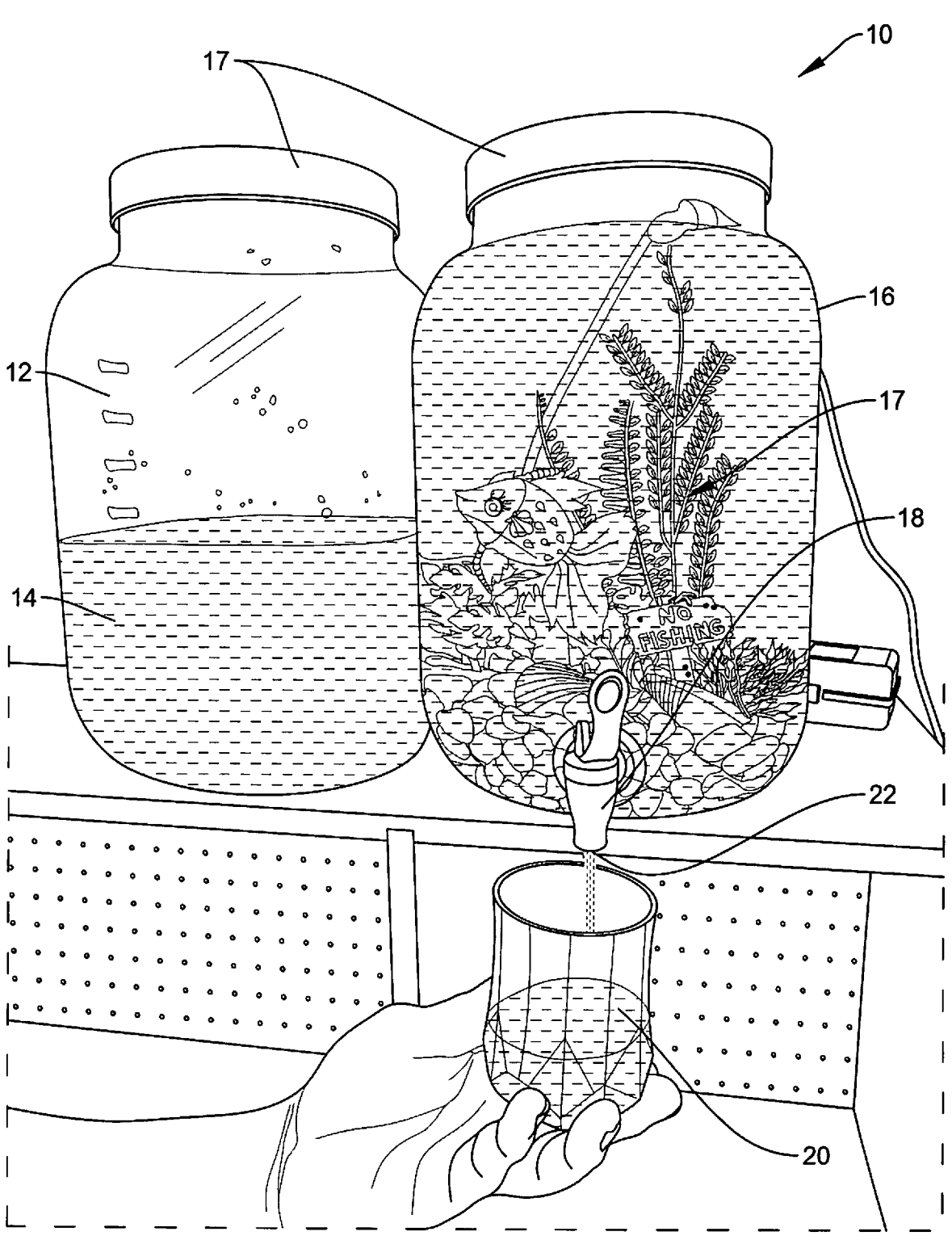
FIG. 2 and FIG. 3 are front and side perspective views, respectively, of a beverage dispensing system, according to various embodiments of the present teachings.
Figure 3:
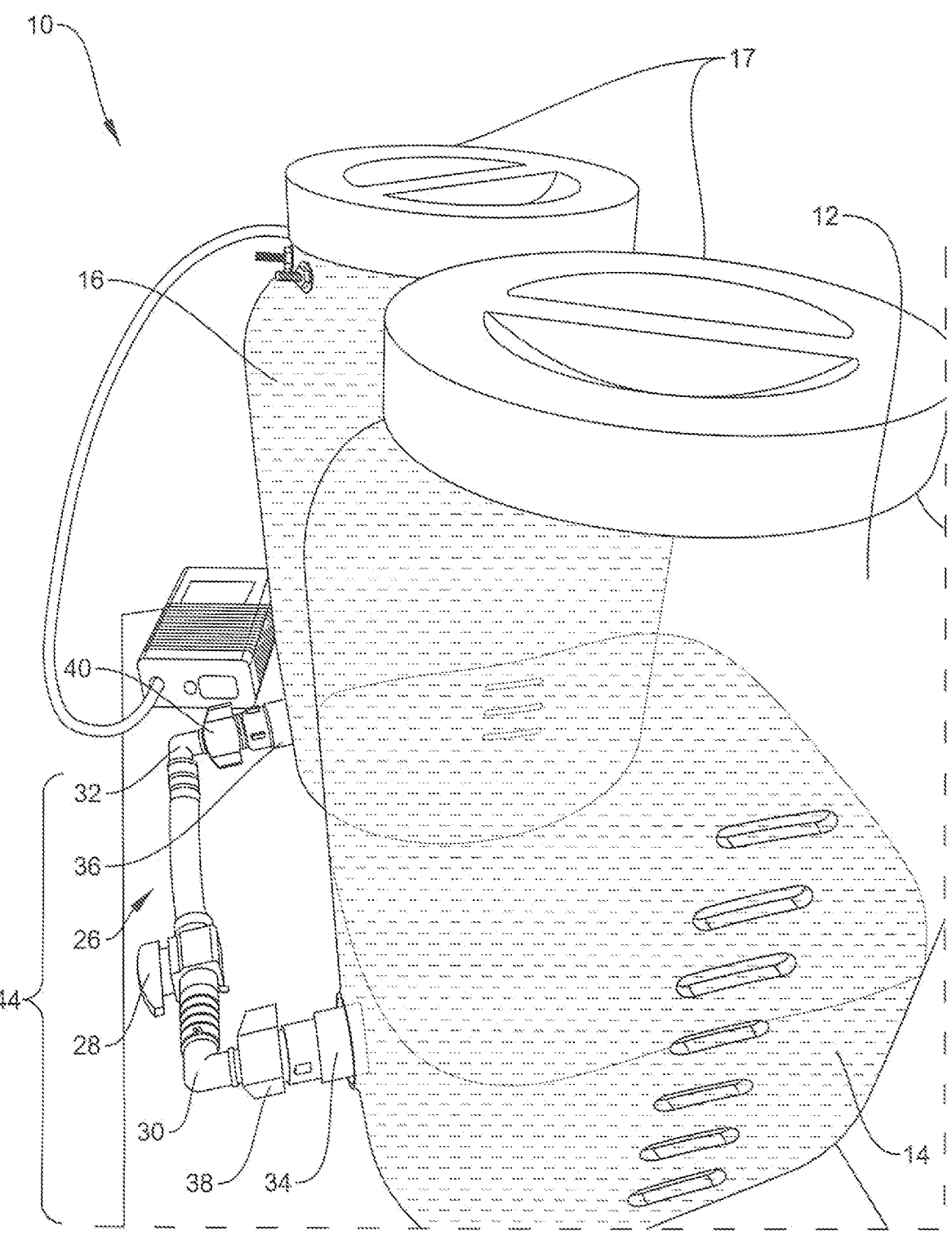

FIGS. 2 and 3 are front and side perspective views, respectively, of a beverage dispensing system 10, according to further embodiments of the present teachings. As depicted in FIG. 2, beverage-supply container 12 and faux beverage-supply container 16 can be disposed in side-by-side relation. As will become apparent, the above-described illusion is substantially maintained as liquid-flow lines for the arrangement (not visible in FIG. 2) are disposed externally along a lower backside region of the two containers, with a portion passing forwardly through the faux beverage-supply container to the dispensing valve assembly—with all such lines being substantially out of view by a user operating the dispensing valve.

FIG. 3 shows an elongate conduit, at 26, for beverage-dispensing system 10 disposed externally along a lower backside region of beverage-supply container 12 and faux beverage-supply container 16. As shown, elongate conduit 26 extends from about abeam the midpoint along the backside of beverage-supply container 12 to about abeam the midpoint along the backside of faux beverage-supply container 16. A manually operable, in-line valve 28 is disposed at a point along elongate conduit 26, for opening and closing elongate conduit 26 to the flow of liquid beverage 14 held in beverage-supply container 12, as desired. A first elbow fitting 30 is provided at an end of elongate conduit 26 proximate beverage-supply container 12. A first short conduit 38 connects the other end of first elbow fitting 30 to a first annular fitting 34 that is secured to and passes through the rearward sidewall of beverage-supply container 12. First annular fitting 34, in turn, provides for fluid communication with the inner volume of beverage-supply container 12, and particularly with liquid beverage 14 held therein.

A second elbow fitting 32 is provided at an end of elongate conduit 26 proximate faux beverage-supply container 16. A second short conduit 40 connects the other end of second elbow fitting 32 to a second annular fitting 36 that is secured to and passes through the rearward sidewall (i.e., opposite the sidewall whereat dispensing valve assembly 18 is disposed) of faux beverage-supply container 16.

Figure 4:
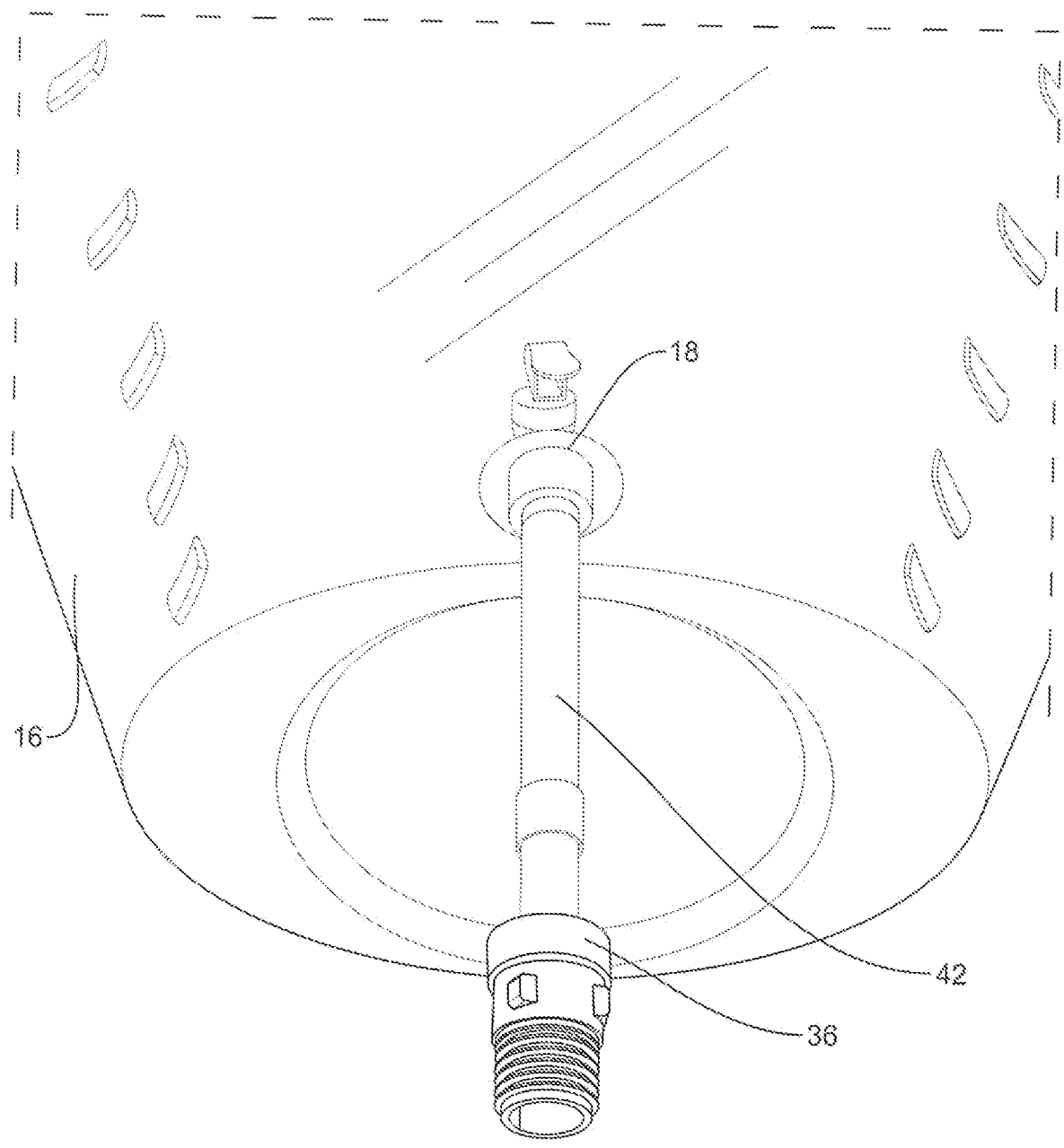
FIG. 4 is a rear perspective view, looking downward, of a bypass conduit that spans opposing sidewall regions of an aquarium tank; with the internal lumen of the bypass conduit being fluidically isolated from the inner volume of the tank and any liquid held therein, according to various embodiments of the present teachings.

Unlike first annular fitting 34, second annular fitting 36 is not configured for fluid communication with the internal volume of its respective container (i.e., faux beverage-supply container 16). Rather, with additional reference now to FIG. 4, an aquarium bypass conduit 42 connects (i) at one end, from within faux beverage-supply container 16, to second annular fitting 36; and (ii) at its other end to an input port of dispensing valve assembly 18, also from within faux beverage-supply container 16. Between these two connection points, aquarium bypass conduit 42 traverses the internal volume of faux beverage-supply container 16.

Together, respective inner lumens of (i) elongate conduit 26, (ii) first elbow fitting 30, (iii) first short conduit 38, and (iv) first annular fitting 34; as well as of (v) second elbow fitting 32, (vi) second short conduit 40, (vii) second annular fitting 36, (viii) aquarium bypass conduit 42, and (ix) dispensing valve assembly 18 define a beverage flow line, indicated generally in FIG. 3 at 44. In operation, upon opening in-line valve 28 and dispensing valve assembly 18, beverage 14 can flow from beverage-supply container 12, along beverage flow line 44, and out of dispensing valve assembly 18. Notably, the inner lumen of aquarium bypass conduit 42, and indeed the entirety of beverage flow line 44, is/are fluidically isolated from the interior volume of aquarium tank 16 and any aquarium water (or other liquid) held therein.

In some circumstances, it can be advantageous to utilize plural beverage-supply containers in a beverage dispensing system of the present teachings, with each beverage-supply container being selectable for fluid communication with a dispensing valve assembly supported on a faux beverage-supply container or tank, such as an aquarium. For example, according to various embodiments, plural beverage supply containers can be employed to increase the supply amount (fluid volume) of one or more beverages available for dispensing. Also, with plural beverage supply containers, while one container is employed to supply beverage held therein for the beverage dispensing system, one or more other containers can be serviced, etc. (e.g., refilled with beverage when low or empty). According to various embodiments, the different beverage supply containers in a plural supply-container arrangement can all hold the same beverage. In further embodiments, the different beverage supply containers in a plural supply-container arrangement can hold any combination of one or more different beverages, as desired.

Figure 5:
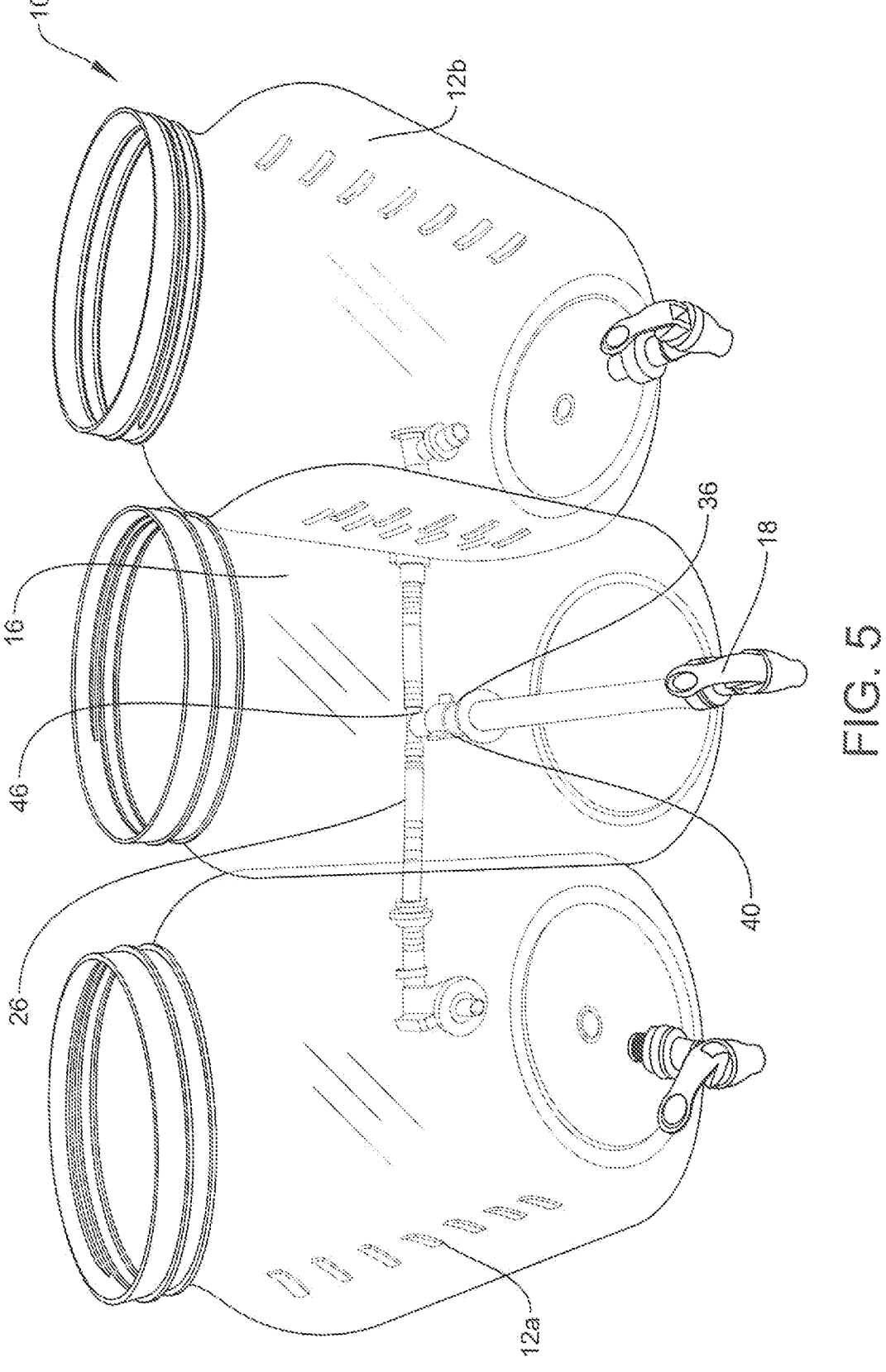
FIG. 5, FIG. 6, and FIG. 7 are front, top, and rear perspective views, respectively, of plural beverage-supply containers flanking a central faux beverage-supply container; and a conduit arrangement defining a beverage-flow line from each of the plural beverage-supply containers to a common dispensing valve assembly disposed on the faux beverage-supply container, according to various embodiments of the present teachings.
Figure 6:
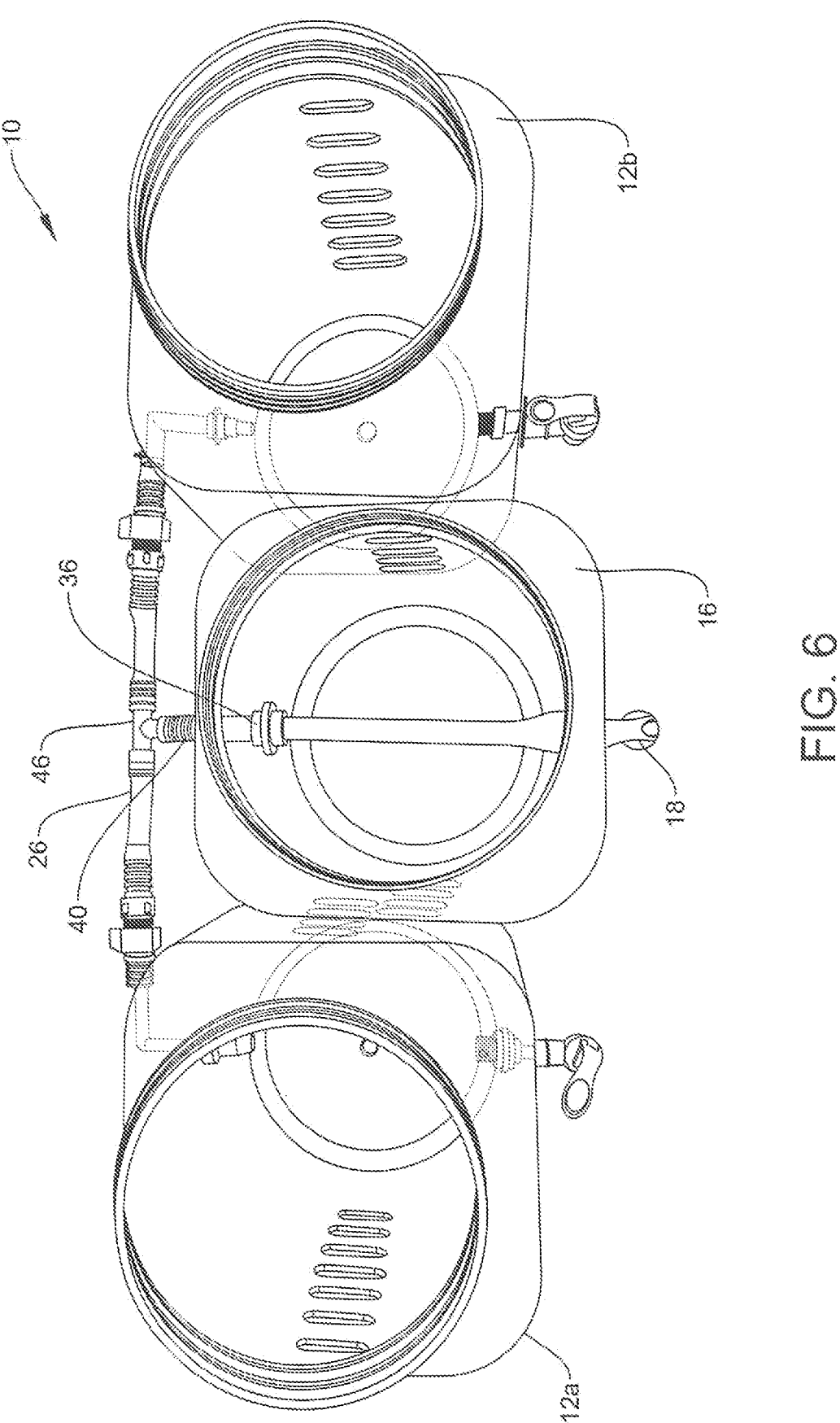
Figure 7:
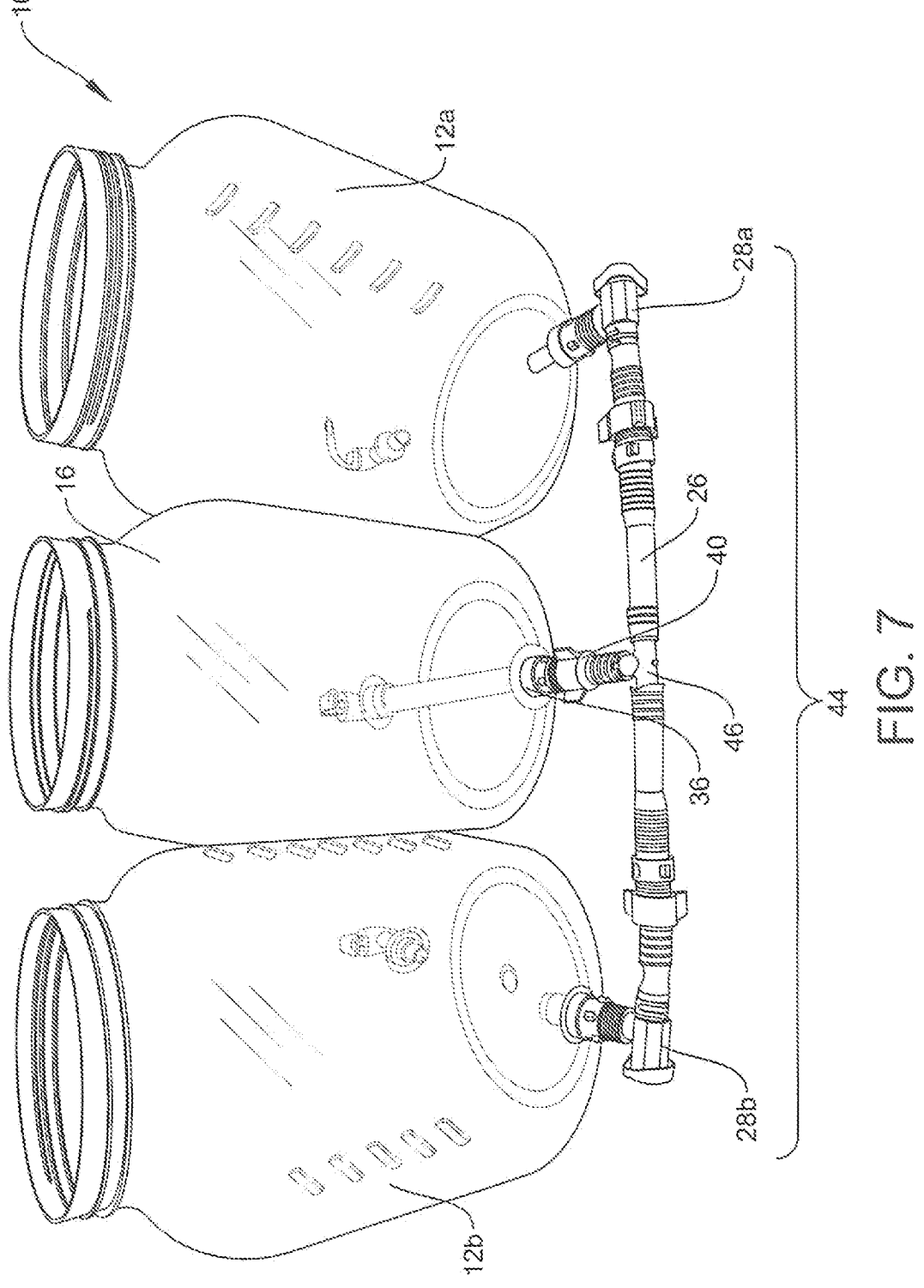

In the depicted embodiment of FIGS. 5-7, first and second beverage supply containers, denoted 12a and 12b, respectively, flank a central faux beverage-supply container or tank, such as aquarium 16. Structurally, the beverage dispensing system of FIGS. 5-7 is substantially like that shown in FIGS. 2-4 and described above. A point of difference, however, relates to the conduit/fitting arrangement defining a beverage flow line 44 (FIG. 7) from the plural beverage-supply containers 12a, 12b to a shared or common dispensing valve assembly 18 on the front of aquarium 16. More particularly, an elongate conduit, denoted at 26, for beverage-dispensing system 10 is disposed externally along a lower backside region of first and second beverage-supply containers 12a, 12b and faux beverage-supply container 16. As shown, elongate conduit 26 extends substantially linearly from about abeam the midpoint along the backside of first beverage-supply container 12a to about abeam the midpoint along the backside of second beverage-supply container 12b.

A manually operable, right-angle valve (FIG. 7: 28a, 28b) is disposed at each end of elongate conduit 26, for opening and closing elongate conduit 26 to the flow of liquid beverage (not shown in FIGS. 5-7) held in a respective beverage-supply container 12a 12b, as desired. A T-joint 46 is disposed centrally along the axial length of elongate conduit 26, which, together with short conduit 40, provides a fluid-flow passage from elongate conduit 26 to annular fitting 36 affixed on the rear of faux beverage-supply container 16.

Further aspects of the present teachings provide a multi-beverage dispensing system configured to give the illusion it dispenses aquarium water, or other liquid generally considered undesirable for drinking, when, in fact, it is configured to dispense a user's selection from among plural (e.g., different) available beverages. According to various embodiments, for example, a user can select a desired beverage from a selection comprising plural beverages upon operating a dispensing valve assembly, such as at 18 in FIGS. 8-9, for example.

Figure 8:
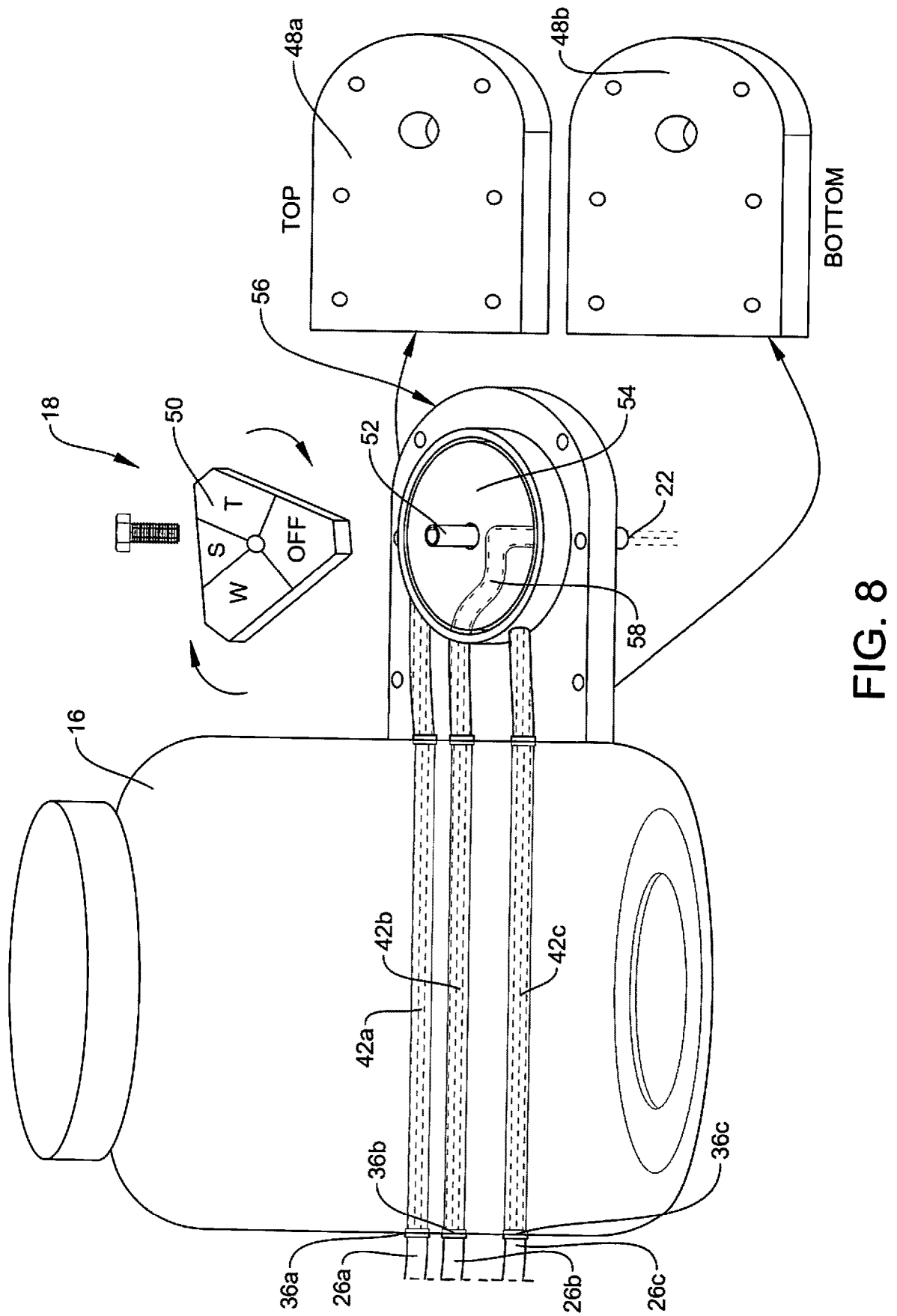
FIG. 8 is a diagrammatic partial side view of a multi-beverage dispensing system, according to various embodiments of the present teachings; and, FIG. 9 is a diagrammatic exploded view of a rotary plug valve useful in selecting and dispensing a desired beverage from a plurality of available beverages, according to various embodiments of the present teachings.

With continued reference to FIG. 8, three separate elongate conduits 26a, 26b, 26c extend from respective remote beverage-supply containers (not shown in FIG. 8) to the lower, rearward side of faux beverage-supply container 16 (e.g., an aquarium tank), where each elongate conduit 26a, 26b, 26c connects in a liquid-tight manner to a respective annular fitting 36a, 36b, 36c in the rearward sidewall of faux beverage-supply container 16. Inside faux beverage-supply container 16, each annular fitting 36a, 36b, 36c connects in a liquid-tight fashion to one end of a respective linear bypass conduit 42a, 42b, 42c. Each linear bypass conduit 42a, 42b, 42c, in turn, extends across the interior volume of faux beverage-supply container 16 toward the forward sidewall, where each terminates adjacent dispensing valve assembly 18.

Figure 9:
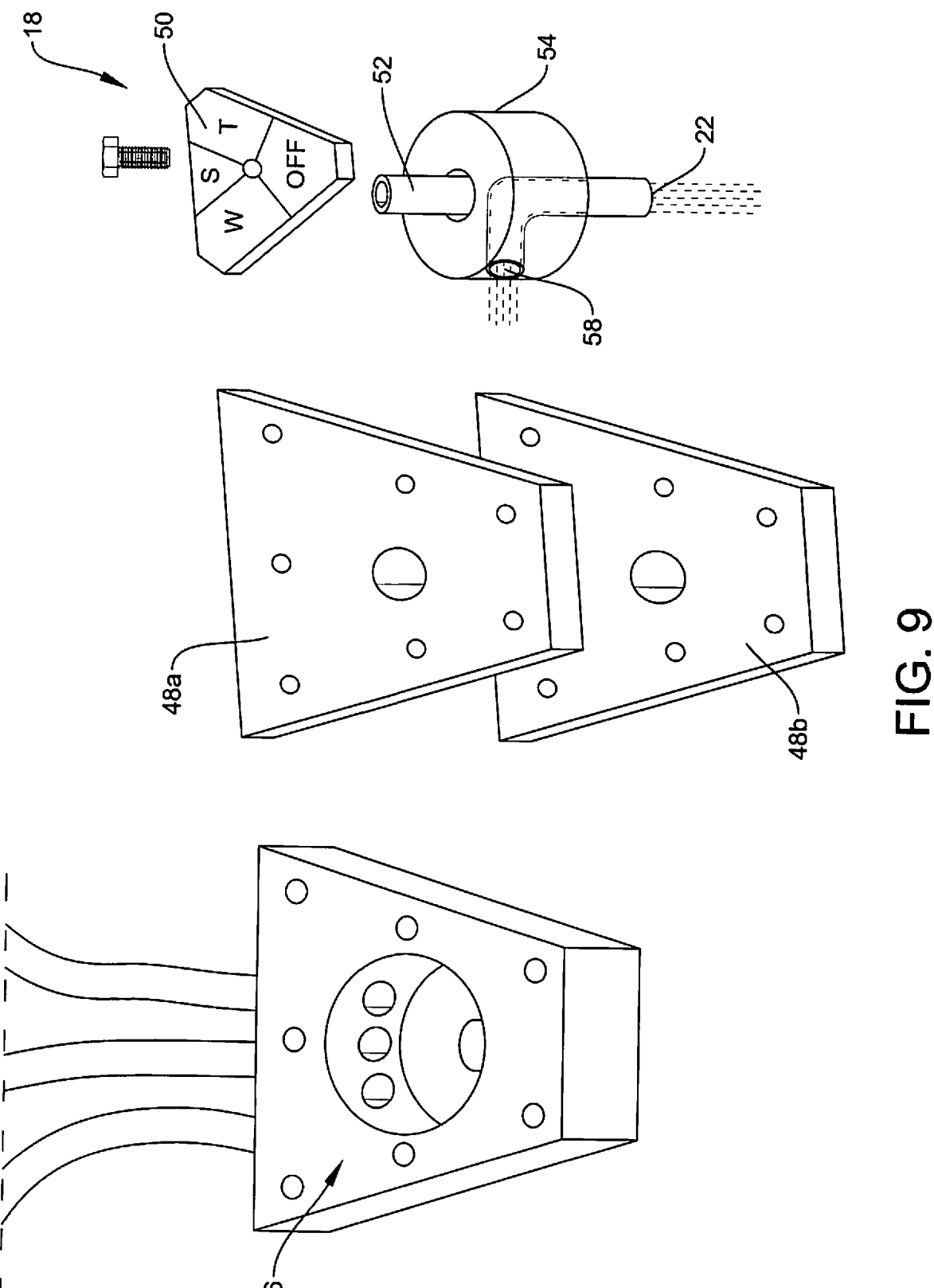

As depicted in FIGS. 8-9, dispensing valve assembly 18 can comprise, for example, a manually operable rotary plug valve. In various embodiments, for example, rotary plug valve 18 includes a knob 50 rigidly attached atop a substantially vertically extending elongate cylindrical shaft 52. The lower end of shaft 52 is rigidly connected to the top of a plug member 54 seated in a valve housing 56. Upper and lower plates 48a, 48b attach to the top and bottom of valve housing 56, respectively. Plate 48a includes a central through-hole through which shaft 52 can pass, and plate 48b includes a central through-hole through which valve outlet 22 can pass.

Rotation of knob 50 causes shaft 52 to rotate, which, in turn, causes rotary plug member 54 to rotate within valve housing 56. Upon rotating plug 54, one end of a passage 58 formed therein can be aligned with an outlet end of a selected one of bypass conduits 42a, 42b, 42c, thereby opening the valve to the selected bypass conduit such that liquid beverage can pass through the dispensing valve assembly and exit at a lower outlet 22 thereof. When one of the bypass-conduit outlet ends is so aligned, the other bypass-conduit outlet ends are sealed or closed to liquid beverage flow by the outer sidewall or surface of the rotary plug member.

All references set forth herein are expressly incorporated by reference in their entireties for all purposes.

Those skilled in the art can now appreciate from the foregoing description that the broad teachings herein can be implemented in a variety of forms. Therefore, while the present teachings have been described in connection with various embodiments and examples, the scope of the present teachings are not intended, and should not be construed to be, limited thereby. Various changes and modifications can be made without departing from the scope of the present teachings.

The invention claimed is:

1. A beverage dispensing system configured to give an illusion the system dispenses aquarium water, comprising:
   (i) a first container configured to hold a first beverage for dispensing;
   (ii) an aquarium tank comprising a top, a bottom, and a sidewall extending between the top and bottom; wherein the aquarium tank is liquid-tight for holding water;
   (iii) a manually operable dispensing valve supported externally on a portion of the sidewall of the aquarium tank; and,
   (iv) a first elongate conduit that extends from the first container, across an interior region of the aquarium tank, through the portion of the sidewall, and to the dispensing valve;
   wherein the first elongate conduit comprises a first end disposed for fluidic communication with the first container and a second end disposed for fluidic communication with the dispensing valve;
   and further wherein the first elongate conduit and the dispensing valve together define a first beverage flow line that is fluidically isolated from the interior of the aquarium tank and said any water held therein;
   whereby, upon operating the dispensing valve, (a) the first beverage flows from the first container, along the first beverage flow line, and out of the dispensing valve, and (b) said any water held in the aquarium tank remains undispensed therein.

2. The system of claim 1, further comprising one or more real or artificial aquarium-related items disposed in the aquarium tank selected from the group consisting of plants, rocks, fish, cleaning equipment, aeration equipment, and any combination of the foregoing.

3. The system of claim 1, further comprising:
   (i) a second container configured to hold a second beverage for dispensing; and,
   (ii) a second elongate conduit that extends from the second container, across a second interior region of the aquarium tank, through the portion of the sidewall, and to the dispensing valve;
   wherein the second elongate conduit comprises a first end disposed for fluidic communication with the second container and a second end disposed for fluidic communication with the dispensing valve;
   and further wherein the second elongate conduit and the dispensing valve together define a second beverage flow line that is fluidically isolated from the interior of the aquarium tank and said any water held therein.

4. The system of claim 3, wherein the dispensing valve comprises a beverage selection manifold; wherein the selection manifold is switchable between a first position for passing substantially only the first beverage through the dispensing valve, a second position for passing substantially only the second beverage through the dispensing valve, and a third position for blocking both the first and second beverages from passing through the dispensing valve.

5. The system of claim 1, wherein the beverage is selected from the group consisting of potable water, wine, soda, juice, and milk.

* * * * *